United States Patent Office 3,045,002
Patented July 17, 1962

3,045,002
PROCESS FOR OBTAINING A PURIFIED POLYOLEFIN FROM A POLYOLEFIN DISPERSION

Siegfried Sommer, Frankfurt am Main, Germany, assignor to Farbwerke Hoechst Aktiengesellschaft vormals Meister Lucius & Brüning, Frankfurt am Main, Germany, a corporation of Germany
No Drawing. Filed Dec. 29, 1958, Ser. No. 783,122
Claims priority, application Germany Jan. 2, 1958
6 Claims. (Cl. 260—93.7)

It is known to polymerize olefins, particularly ethylene and propylene, in the presence of catalyst mixtures consisting of a reducible heavy metal compound and an organo-metal compound at relatively low pressures and temperatures to yield polymers of high molecular weight which are suitable as plastic materials. In practice catalyst mixtures of titanium tetrachloride or titanium trichloride and aluminum-organic compounds which may contain halogen, such as diethyl-aluminum monochloride, have proved to be particularly suitable for said low pressure polymerizations.

The polyolefins thus obtained are called low pressure polyolefins or Ziegler polyolefins. In general, the polymerization with the use of the above catalysts is carried out in inert solvents, for example hydrocarbons, such as pentane, hexane, heptane, octane, etc., cyclohexane, hydrogenated petroleum fractions having a boiling range from 40 to 220° C., toluene and xylene.

The polymer is obtained in finely divided form suspended in the solvent and it must be freed in further operations from the solvent and still adhering or included catalyst residues. It is highly important that all foreign constituents are completely removed in the following working stages since the quality of polyolefins of this kind is largely impaired by remaining catalyst residues. Since the catalyst mixtures used in the polymerization always contain high chlorine portions (for example $TiCl_4$ and $Al(C_2H_5)_2Cl$) above all a total elemination or neutralization of said aggressive constituents must be warranted.

According to an older proposal not belonging to the state of the art said polyolefins are worked up by stirring the polymers obtained in suspension for some time with an alcohol and then extracting the mixture exhaustively with water. When carrying out this process highly valuable products are obtained which behave absolutely satisfactorily in the further working up. It is of advantage to use monohydric alcohols, such as propanol, butanols, pentanols, which are miscible with the dispersing agent to an extent and, furthermore, possess a certain solubility in water. Dihydric and polyhydric alcohols, such as glycol or glycerol, are relatively unsuitable since they exhibit only an insufficient solubility in hydrocarbons.

Now I have found that Ziegler polyolefin dispersions containing hydrocarbons as dispersing medium, which dispersions are obtained by polymerizing olefins in the presence of a catalyst of an organo-metal compound, such as aluminum alkyls which may contain halogen atoms, for instance diethyl aluminum monochloride, and a heavy metal salt of an element of subgroups IV–VIII of the periodic table, such as titanium tetrachloride, can be purified by treating said dispersions at a temperature in the range from 30 to 100° C. with an ether selected from the group consisting of a monoether from a monohydric alcohol of 1 to 8 carbon atoms with a dihydric alcohol containing up to 8 carbon atoms or a diether from a monohydric alcohol of 1 to 8 carbon atoms with a trihydric alcohol containing up to 8 carbon atoms in an amount of 0.2 to 5%, calculated on the dispersing medium, and working up the dispersion as usual. It is essential that the ether used still contains a free hydroxyl group, that is to say represents an alkoxy alcohol, such as 3-methoxy-butanol-1, ethylene glycol monobutyl ether and the like. It is of advantage to stir up the suspension of a low pressure polyolefin for some time at 30 to 100° C. with about 0.2 to 5%, preferably 1 to 4%, of a mono- or diether of a dihydric or trihydric alcohol, calculated on the dispersing medium and then either to filter the mixture or better to extract repeatedly with water. The mixture can then be further treated as usual, for example by means of a steam distillation for the removal of the dispersing medium.

In the process of the present invention there may be used as ethers 3-methoxy-butanol-1, ethylene glycol monoethyl ether, hexylene glycol monoethyl ether, glycerol dipropyl ether-2,3

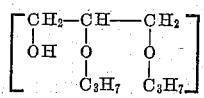

or glycerol dibutyl ether-2,3

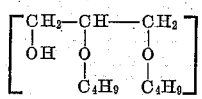

The polymers obtained by the process of the invention only contain very small amounts of residual catalyst and, therefore, they do not show any discoloration in the working up.

As compared with the working up by means of monohydric alcohols the present purification method exhibits the particular advantage that the additive, i.e. the alkoxy alcohol, can be eliminated from the dispersing medium in an extremely easy manner, that is to say with small amounts of water. It turned out that the dispersing medium obtained when the polymerization and the working up have been completed can be re-used successfully in a new polymerization without preliminary distillation in case the component that destroys the catlayst is carefully removed from the dispersing medium by washing with water. When n-butanol is used, for example, in the working up the dispersing medium employed has to be washed with water very intensely and repeatedly since n-butanol is soluble in water to a limited extent only. When, however, 3-methoxy-butanol-1 is used, for example, in the purification of the polyolefin the additional component can be substantially removed from the dispersing medium already with the addition of a very small amount of water and in a single washing operation.

The following examples serve to illustrate the invention but they are not intended to limit it thereto.

Example 1

100 liters of polyethylene suspension containing 40 kilograms of polyethylene are produced by polymerizing ethylene with a mixture of titanium tetrachloride, titanium trichloride and diethylaluminum monochloride with the use of a saturated petroleum fraction boiling between 100 and 140° C. as dispersing medium. The polymerization being complete 3 liters of 3-methoxybutanol-1 are added to the polymer suspension and the mixture is stirred for 1 hour at 80° C. Then 50 liters of water which is free of salt are added, the mixture is well stirred for another 15 minutes and the organic phase is separated from the aqueous phase. The aqueous phase has a dark violet blue color and contains practically the total catalyst. The polymer is separated from the dispersing medium by means of a filter and subjected, suitably with the addition of 40 grams of a known alkyl-sulfonate (emulsifier), to a steam distillation for the removal of the residual hydrocarbon. The reaction product is then filtered, washed again with 50 liters of water which is free of salt and dried in a vacuum cabinet at 80° C.

A pure white polyethylene powder is obtained having an ash residue on ignition of 0.01%. The product is very well suitable for the manufacture of shaped articles.

Example 2

By polymerizing propylene under a reaction pressure of 4 atmospheres gauge 300 grams of low pressure polypropylene are produced in 1 liter of a saturated petroleum fraction having a boiling range from 200 to 220° C. with the use of 3 millimols of a $TiCl_3$ catalyst, developed for the isotactic polymerization, and 5 millimols of diethylaluminum monochloride. The polymerization being complete the suspension is admixed with 50 cc. of ethylene glycol monoethyl ether and the mixture is stirred for 2 hours at 85° C. The polymer is then separated from the dispersing medium by means of a filter and after-washed on the filter with 500 cc. of hydrocarbon having a temperature of 75° C. For the removal of the solvent the low pressure polypropylene containing the dispersing medium is then suspended in 2 liters of water which contain 5 grams of a wetting agent on the basis of alkylphenolpolyglycol ether and treated with steam until no more dispersing medium passes over. The reaction product is then filtered off, washed twice with water which is free of salt and dried at 85° C.

The polypropylene powder thus obtained has an ash residue on ignition of 0.03%.

I claim:

1. In a process for obtaining a purified Ziegler polyolefin from a Ziegler polyolefin dispersion containing a hydrocarbon as dispersing medium which dispersion is obtained by polymerizing a monoolefin in the presence of a catalyst of an alkyl aluminum compound and a chloride of a heavy metal subgroups IV–VIII of the periodic table, the improvement which comprises treating said dispersion at a temperature in the range from 30–100° C. with an ether selected from the group consisting of a monoether of a monohydric alcohol of 1–8 carbon atoms with a glycol containing up to 8 carbon atoms and a diether of a monohydric alcohol of 1–8 carbon atoms with glycerol, in an amount of 0.2–5%, calculated on the dispersing medium, and then adding water thereto, filtering the polymer dispersion, and steam-distilling the wet polymer.

2. The process of claim 1 wherein the monoether employed is 3-methoxy-butanol-1.

3. The process of claim 1 wherein the monoether employed is ethylene glycol monoethyl ether.

4. The process of claim 1 wherein the diether employed is glycerol dipropyl ether-2,3.

5. The process of claim 1 wherein the diether employed is glycerol dibutyl ether-2,3.

6. The process of claim 1 wherein said ether is added to said polyolefin dispersion in an amount of 1–4% calculated on the dispersing medium.

References Cited in the file of this patent

UNITED STATES PATENTS 2,841,574    Foster _____ July 1, 1958
2,887,473    Balthis _____ May 19, 1959